United States Patent
Ishibashi et al.

(10) Patent No.: US 10,336,173 B1
(45) Date of Patent: Jul. 2, 2019

(54) MOUNTING STRUCTURE FOR POWER UNIT OF UTILITY VEHICLE

(71) Applicant: KAWASAKI JUKOGYO KABUSHIKI KAISHA, Hyogo (JP)

(72) Inventors: Kazuki Ishibashi, Hyogo (JP); Kazumasa Hisada, Hyogo (JP); Akiyuki Yamasaki, Hyogo (JP); Naoki Arino, Hyogo (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 15/936,768

(22) Filed: Mar. 27, 2018

(51) Int. Cl.
*B60K 5/02* (2006.01)
*B60K 17/24* (2006.01)
*B60K 17/08* (2006.01)

(52) U.S. Cl.
CPC .............. *B60K 5/02* (2013.01); *B60K 17/08* (2013.01); *B60K 17/24* (2013.01)

(58) Field of Classification Search
CPC ........... B60K 5/02; B60K 17/08; B60K 17/24
See application file for complete search history.

(56) References Cited

U.S. PATENT DOCUMENTS

| | | | | |
|---|---|---|---|---|
| 4,205,729 A * | 6/1980 | Morino | ................ | B60K 5/02 180/292 |
| 4,412,597 A * | 11/1983 | Aiba | .................. | B62M 7/02 180/228 |
| 4,420,060 A * | 12/1983 | Kakinnoto | ............ | F16F 13/105 180/300 |
| 4,564,082 A * | 1/1986 | Takehara | ................. | B60K 5/04 180/291 |
| 5,042,321 A * | 8/1991 | Hongo | ................... | B60K 17/00 74/467 |
| 5,074,374 A * | 12/1991 | Ohtake | ................ | B60K 5/1216 180/300 |
| 5,740,876 A * | 4/1998 | Shimose | .............. | B60K 5/1216 180/232 |
| 5,915,495 A * | 6/1999 | Kerlin | .................. | B62D 21/183 180/291 |
| 5,992,555 A * | 11/1999 | Sakamoto | ............ | B60K 5/1216 180/232 |
| 6,386,309 B1 * | 5/2002 | Park | ..................... | B60K 5/1216 180/291 |
| 6,390,224 B1 * | 5/2002 | Yoshida | ................. | B62D 21/00 180/311 |
| 6,823,960 B2 * | 11/2004 | Shimizu | ................... | B60K 5/12 180/228 |
| 7,316,410 B2 * | 1/2008 | Ogura | ..................... | B62K 19/00 280/274 |
| 7,445,076 B2 * | 11/2008 | Shigematsu | ........ | B60K 5/1216 180/298 |

(Continued)

*Primary Examiner* — Erez Gurari
(74) *Attorney, Agent, or Firm* — Wenderoth, Lind & Ponack, L.L.P.

(57) ABSTRACT

The invention provides a mounting structure for a power unit of a utility vehicle. The mounting structure includes a pair of left and right front support portions supporting a front end of the power unit, and a rear support portion supporting a rear end of the power unit. The front support portions and the rear support portion are disposed to cause a centroid of a triangle connecting the front support portions and the rear support portion to agree with a centroid of the power unit in a planar view of the power unit.

5 Claims, 8 Drawing Sheets

(56) References Cited

U.S. PATENT DOCUMENTS

| | | | | |
|---|---|---|---|---|
| 7,588,117 B2* | 9/2009 | Fukuda | ............. | B60K 1/00 |
| | | | | 180/291 |
| 8,511,416 B2* | 8/2013 | Hiruma | ............. | B60K 1/00 |
| | | | | 180/291 |
| 8,517,136 B2* | 8/2013 | Hurd | ............. | B60K 5/1241 |
| | | | | 180/233 |
| 8,727,063 B1* | 5/2014 | Yamamoto | ......... | B60K 5/1216 |
| | | | | 180/291 |
| 8,813,883 B2* | 8/2014 | Fujiwara | ............ | B60K 6/46 |
| | | | | 180/312 |
| 8,844,493 B2* | 9/2014 | Takano | ............. | F01M 1/10 |
| | | | | 123/196 A |
| 8,944,449 B2* | 2/2015 | Hurd | ............. | B60K 5/00 |
| | | | | 280/124.152 |
| 9,452,670 B2* | 9/2016 | Oshima | ............. | B60K 5/12 |
| 9,499,037 B2* | 11/2016 | Yamamoto | ............ | B60K 5/12 |
| 10,081,245 B2* | 9/2018 | Sangha | ............. | B60K 17/24 |
| 10,082,201 B2* | 9/2018 | Eriksson | ............ | F16H 57/025 |
| 2002/0179353 A1* | 12/2002 | Robinson | ......... | B62D 25/2072 |
| | | | | 180/69.1 |
| 2004/0222028 A1* | 11/2004 | Mizuta | ............. | B60K 17/24 |
| | | | | 180/235 |
| 2009/0321202 A1* | 12/2009 | Hamada | ............ | F16F 13/1463 |
| | | | | 188/322.5 |
| 2011/0094818 A1* | 4/2011 | Suzuki | ............. | B60K 5/02 |
| | | | | 180/292 |
| 2017/0057351 A1* | 3/2017 | Bandy | ............. | B60K 17/358 |

* cited by examiner

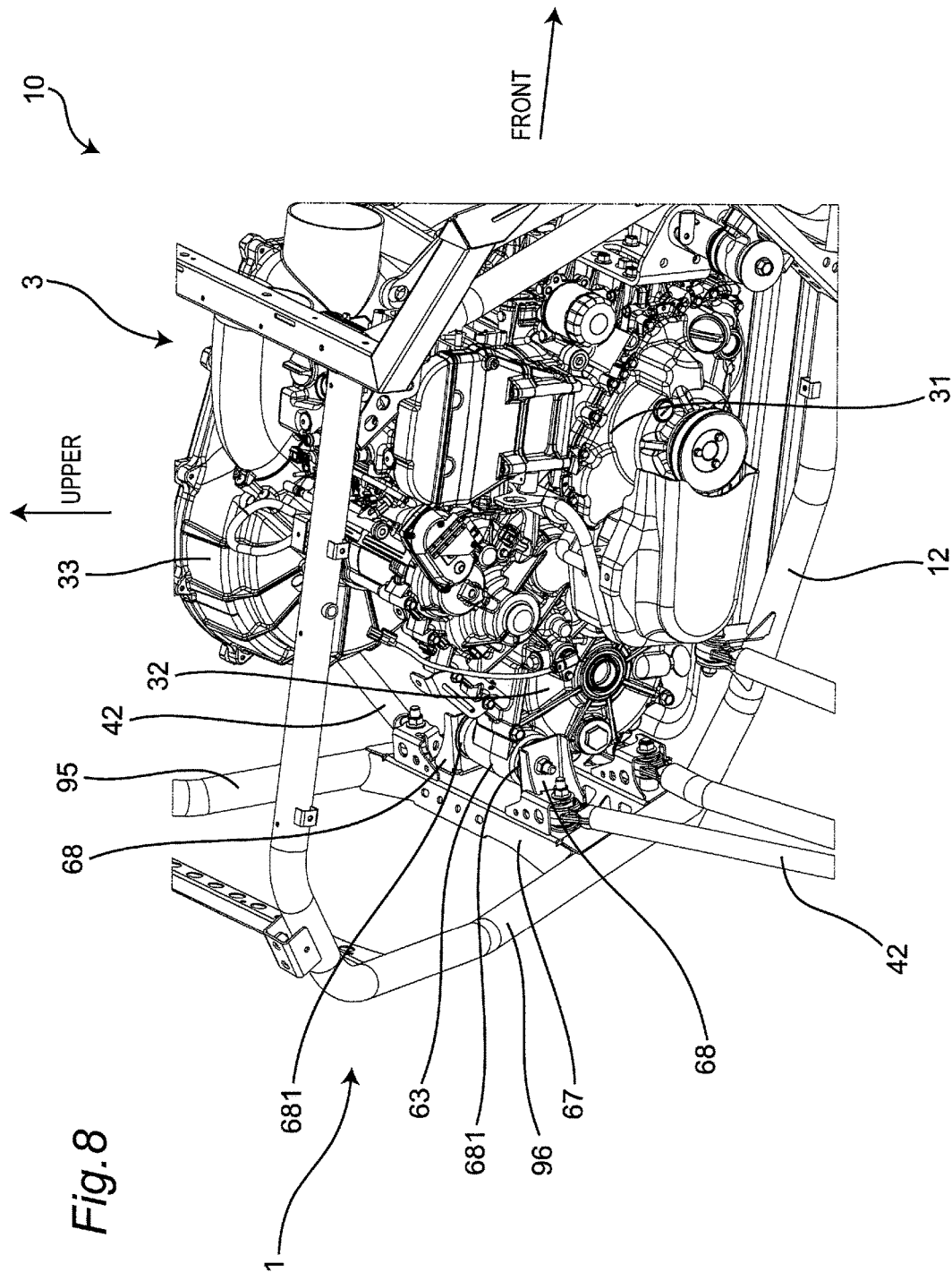

MOUNTING STRUCTURE FOR POWER UNIT OF UTILITY VEHICLE

BACKGROUND OF THE INVENTION

1. Field of the Invention

The present invention relates to a mounting structure for a power unit of a utility vehicle.

2. Description of the Related Art

As disclosed in U.S. Pat. No. 9,499,037, a power unit of a utility vehicle is conventionally supported at totally five points including a pair of left and right front portions, a pair of left and right rear portions, and a torque rod.

SUMMARY OF THE INVENTION

The power unit of the utility vehicle is supported at the number of points, which complicates a mounting structure therefor.

In view of this, an object of the present invention is to provide a mounting structure for a power unit of a utility vehicle, and the mounting structure is simplified but reduces vibration of the power unit.

In order to achieve the object mentioned above, the present invention provides a mounting structure for a power unit of a utility vehicle, the mounting structure including: a pair of left and right front support portions supporting a front end of the power unit; and a rear support portion supporting a rear end of the power unit; in which the front support portions and the rear support portion are disposed to cause a centroid of a triangle connecting the front support portions and the rear support portion to agree with a centroid of the power unit in a planar view of the power unit.

The mounting structure thus configured for the power unit is simplified with support portions including the front support portions and the rear support portion, as well as reduces horizontal vibration of the power unit by causing the centroid of the triangle connecting the front support portions and the rear support portion to agree with the centroid of the power unit.

The mounting structure for the power unit of the utility vehicle according to the present invention is preferred to further include any of the following configurations.

(1) The front support portions and the rear support portion are disposed to cause the centroid of the power unit to be positioned on a straight line connecting each of the front support portions and the rear support portion in a side view of the power unit.

(2) The pair of left and right front support portions is supported by a pair of left and right gussets reinforcing a main frame and is coupled by a cross member extending in a vehicle width direction, and the rear support portion is supported by a rear end member rising from a rear end of the main frame.

(3) In the configuration (2), the rear end member supports a plurality of control rods extending in the vehicle width direction and coupling the rear end member and a rear end of a trailing arm extending in an anteroposterior direction.

(4) The power unit includes an engine, a transmission, and a V-belt continuously variable transmission, and the engine generates driving power transmitted to the transmission via the continuously variable transmission.

In the configuration (1), the centroid of the power unit is positioned on the straight line connecting each of the front support portions and the rear support portion for reduction in vertical vibration of the power unit.

In the configuration (2), the front support portions are supported by the gussets attached to the main frame, without need for any dedicated bracket attached directly to the main frame, to simplify the mounting structure for the power unit.

The rear support portion is supported by the rear end member rising from the rear end of the main frame and thus stably supports the power unit.

The configuration (3) includes the single rear support portion for higher design flexibility in disposition of the control rods and the like at the rear end of the main frame, which improves stability and performance of a suspension device.

The configuration (4) relates to a specific configuration of the power unit and facilitates transmission of driving power of the engine.

In summary, the present invention provides a further simplified mounting structure for a power unit of a utility vehicle.

BRIEF DESCRIPTION OF THE DRAWINGS

FIG. 8 is a rear perspective view from a direction different from FIG. 7, of the power unit.

DETAILED DESCRIPTION OF THE PREFERRED EMBODIMENTS

Hereinafter, a utility vehicle having a mounting structure for a power unit according to an embodiment of the present invention is described with reference to attached drawings. The utility vehicle is a vehicle for off-road traveling which travels not only on a grass field, a gravel field and a sandy field but also on an unpaved mountain road, a forest road, a muddy road, a rocky area or the like. For the sake of convenience of the description, an advancing direction of the utility vehicle is assumed as a "front side" of the utility vehicle and respective parts, and right and left sides in a vehicle width direction when an occupant riding on the utility vehicle faces forward are assumed as "right and left sides" of the utility vehicle and the respective parts.

[Entire Structure of Vehicle]

Figure 1:
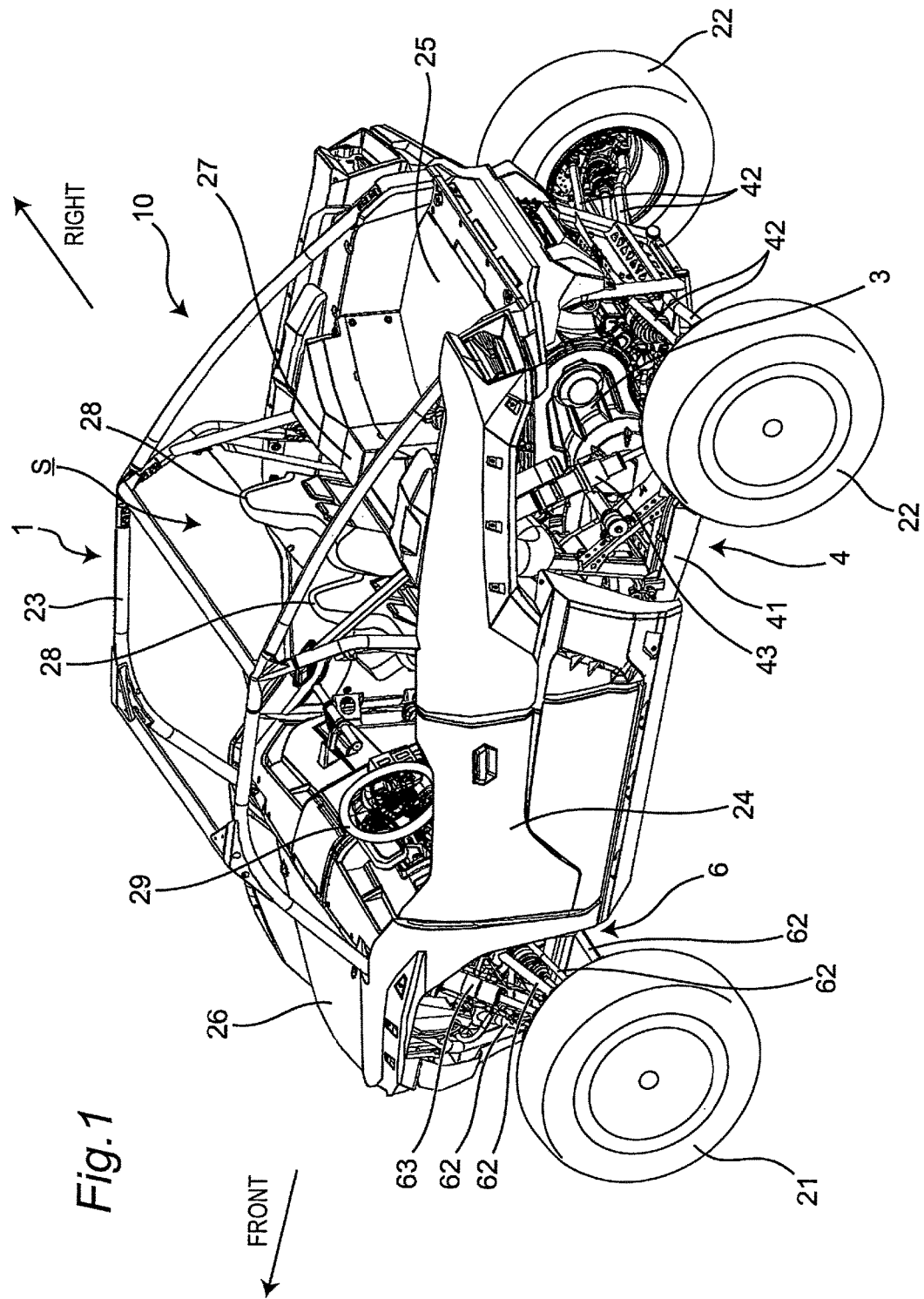
FIG. 1 is a perspective view of a utility vehicle including a mounting structure for a power unit according to an embodiment of the present invention.
Figure 2:
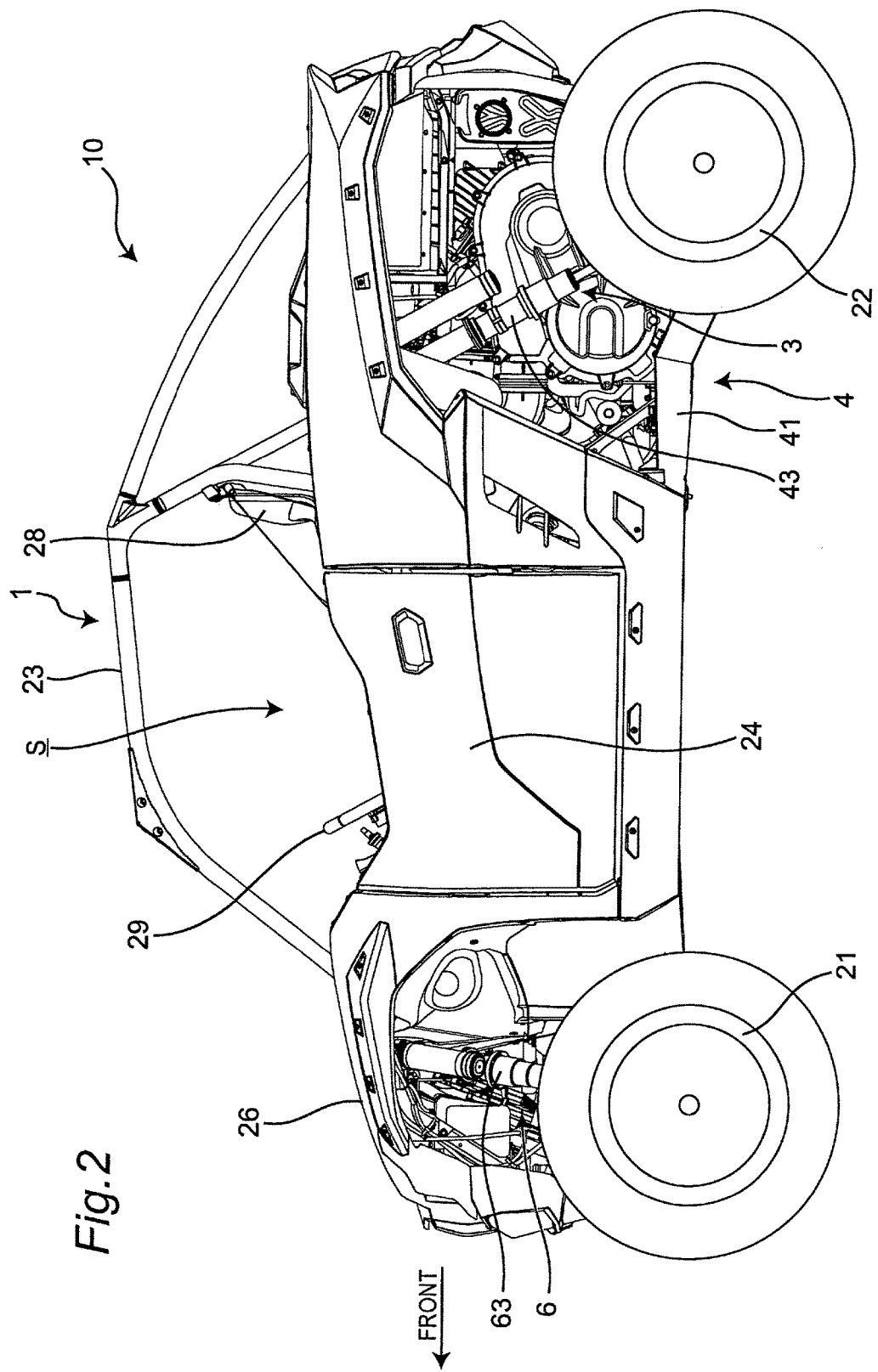
FIG. 2 is a left side view of the utility vehicle depicted in FIG. 1.

FIG. 1 is a perspective view of a utility vehicle including a mounting structure for a power unit according to an embodiment of the present invention. FIG. 2 is a left side view of the utility vehicle depicted in FIG. 1.

As shown in FIG. 1 and FIG. 2, a utility vehicle 10 includes a pair of right and left front wheels 21 on a front portion of a vehicle body and a pair of right and left rear wheels 22 on a rear portion of the vehicle body. The utility vehicle 10 includes a riding space (cabin) S between the front wheels 21 and the rear wheels 22. The riding space S is surrounded by a ROPS 23, and a pair of right and left doors 24. The ROPS is an abbreviation of "rollover protective structure", and is a part of a vehicle body frame 1.

A cargo bed 25 is disposed behind the riding space S, and a bonnet 26 is disposed in front of the riding space S. A back panel 27 which partitions the cargo bed 25 and the riding space S from each other is mounted on a front end of the cargo bed 25.

A pair of right and left independent-type seats 28 is disposed in the inside of the riding space S. An operating part such as a steering wheel 29 is disposed in front of the seat 28.

Figure 3:
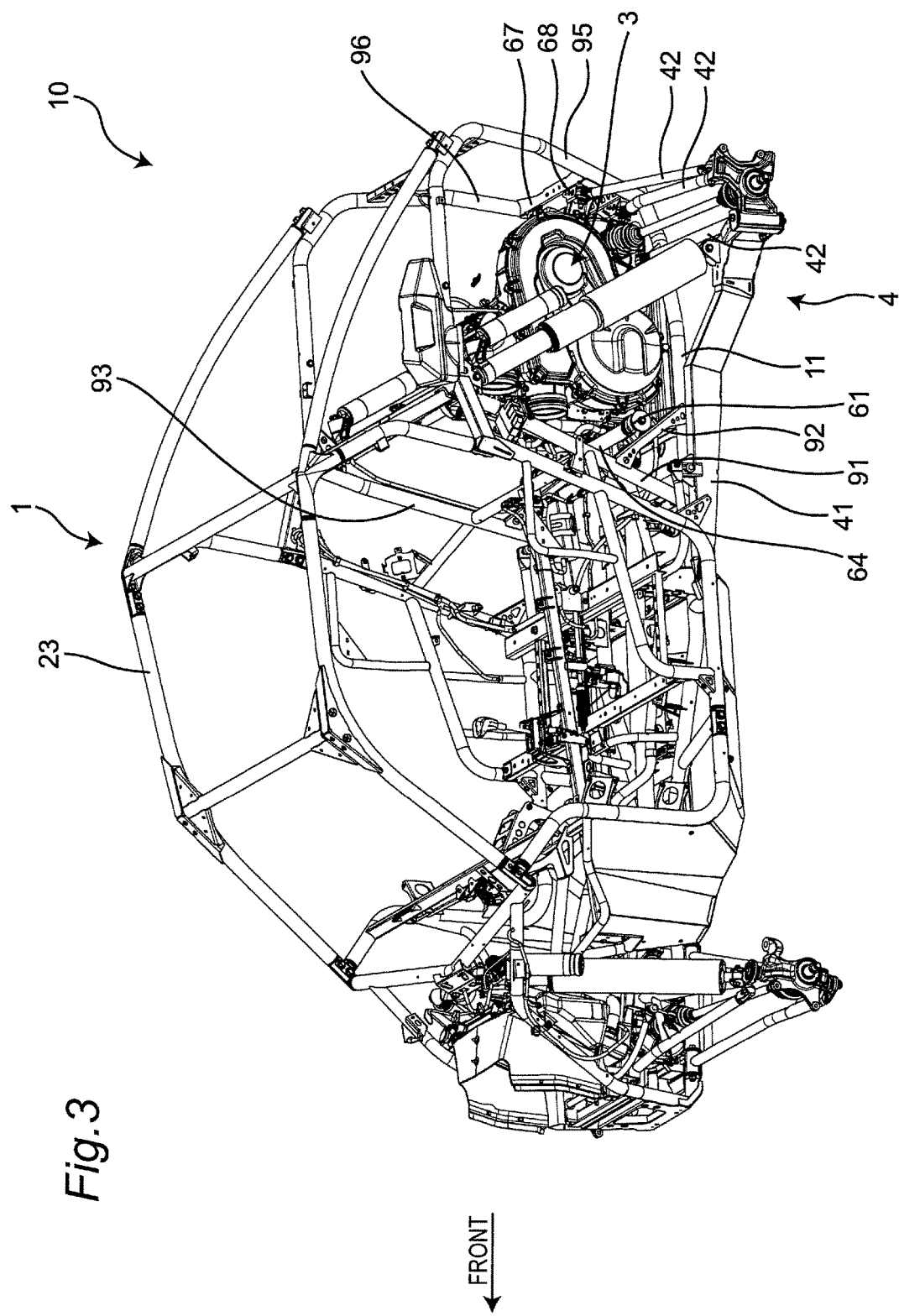
FIG. 3 is a perspective view indicating disposition of the power unit.
Figure 4:
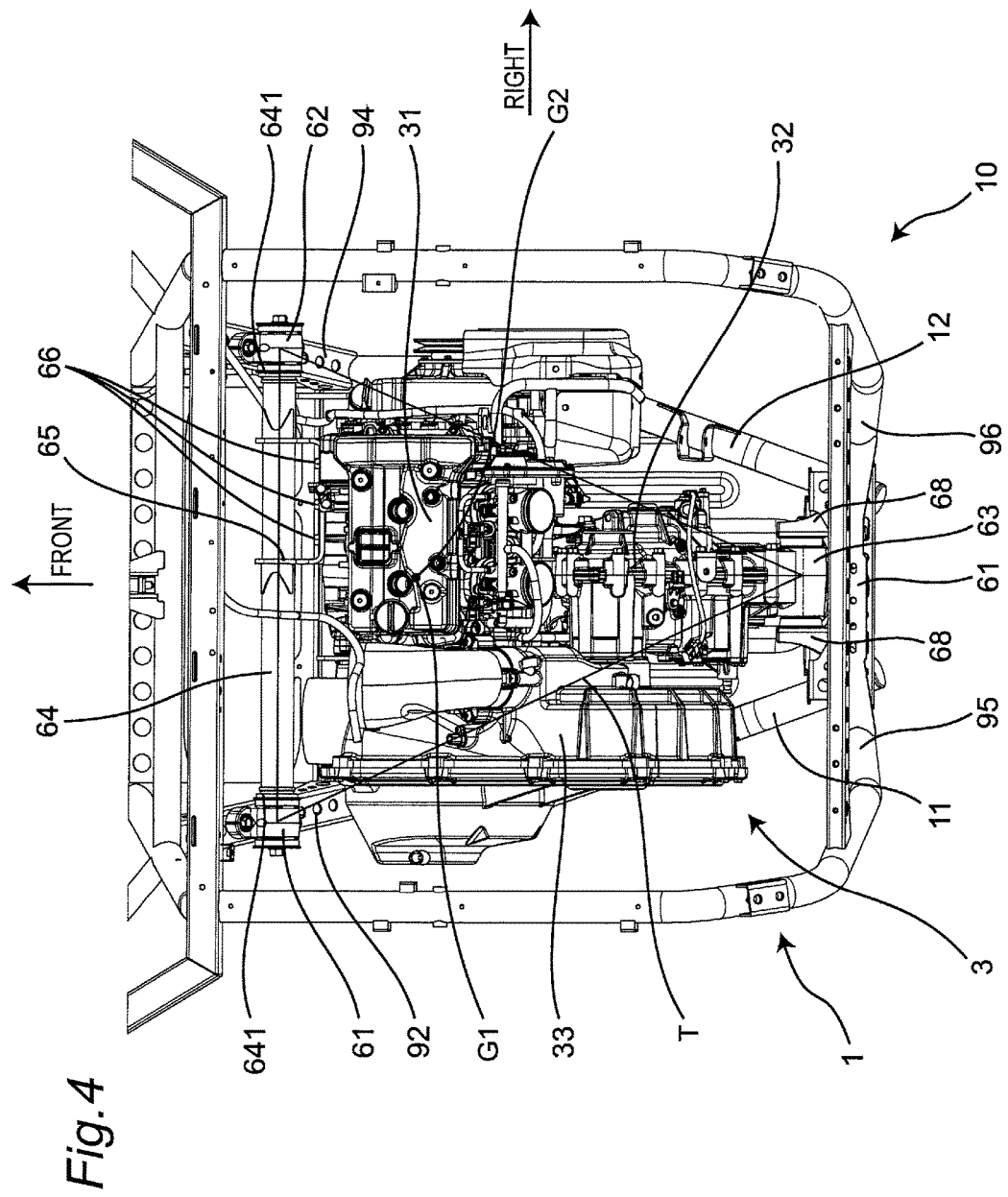
FIG. 4 is a top view of the power unit.

The cargo bed 25 is provided therebelow with a power unit 3. FIG. 3 is a perspective view indicating disposition of the power unit 3, and FIG. 4 is a top view of the power unit 3. As depicted in FIGS. 3 and 4, the power unit 3 includes an engine 31, a transmission 32 disposed behind the engine 31, and a V-belt continuously variable transmission 33 disposed on the left of the engine 31 and the transmission 32. The engine 31 generates driving power transmitted to the transmission 32 via the continuously variable transmission 33, and the transmission 32 transmits driving power to the pair of left and right front wheels 21 and the pair of left and right rear wheels 22.

Figure 5:
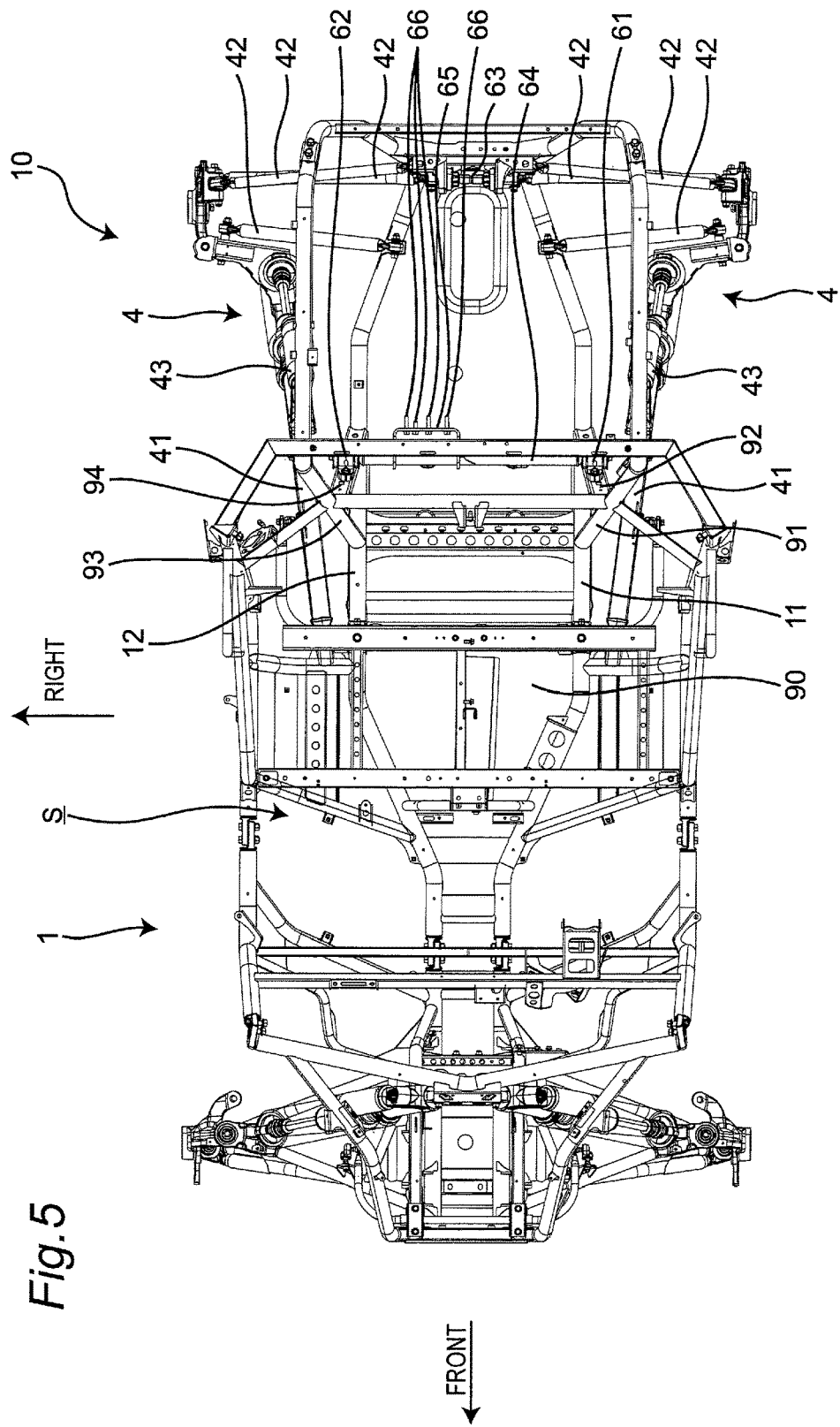
FIG. 5 is a top view excluding the power unit and a ROPS depicted in FIG. 3.

FIG. 5 is a top view excluding the power unit 3 and the ROPS 23 depicted in FIG. 3. As depicted in FIG. 5, the vehicle body frame 1 includes a bottom first frame 11 and a bottom second frame 12 that are paired and disposed on the left and on the right at the bottom, and extend substantially horizontally in the anteroposterior direction to support a bottom plate 90. The bottom first frame 11 and the bottom second frame 12 configure a main frame made of a tubular pipe frame.

The bottom first frame 11 and the bottom second frame 12 are positioned in a center portion in the vehicle width direction to come closest to each other in the vehicle width direction in a front portion of the riding space S, and extend backward from the front portion of the riding space S slantedly outward in the vehicle width direction to be distant from each other in the vehicle width direction. The bottom first frame 11 and the bottom second frame 12 extend backward parallelly to each other in the anteroposterior direction below the seats 28, and extend backward from a rear portion of the power unit 3 slantedly inward in the vehicle width direction to come close to each other in the vehicle width direction.

There is provided, below the cargo bed 25 and on respective sides of the power unit 3, a pair of left and right independent suspension devices 4 for the rear wheels. The suspension devices 4 vertically swingably support the pair of left and right rear wheels 22. The suspension devices 4 each include a trailing arm 41 having a front end supported by the vehicle body frame 1 and extending in the anteroposterior direction, a plurality of control rods 42 extending in the vehicle width direction and supporting the rear end of the trailing arm 41 to the vehicle body frame 1, and a shock absorber 43 elastically supporting the trailing arm 41 to the vehicle body frame 1.

[Mounting Structure for Power Unit]

Figure 6:
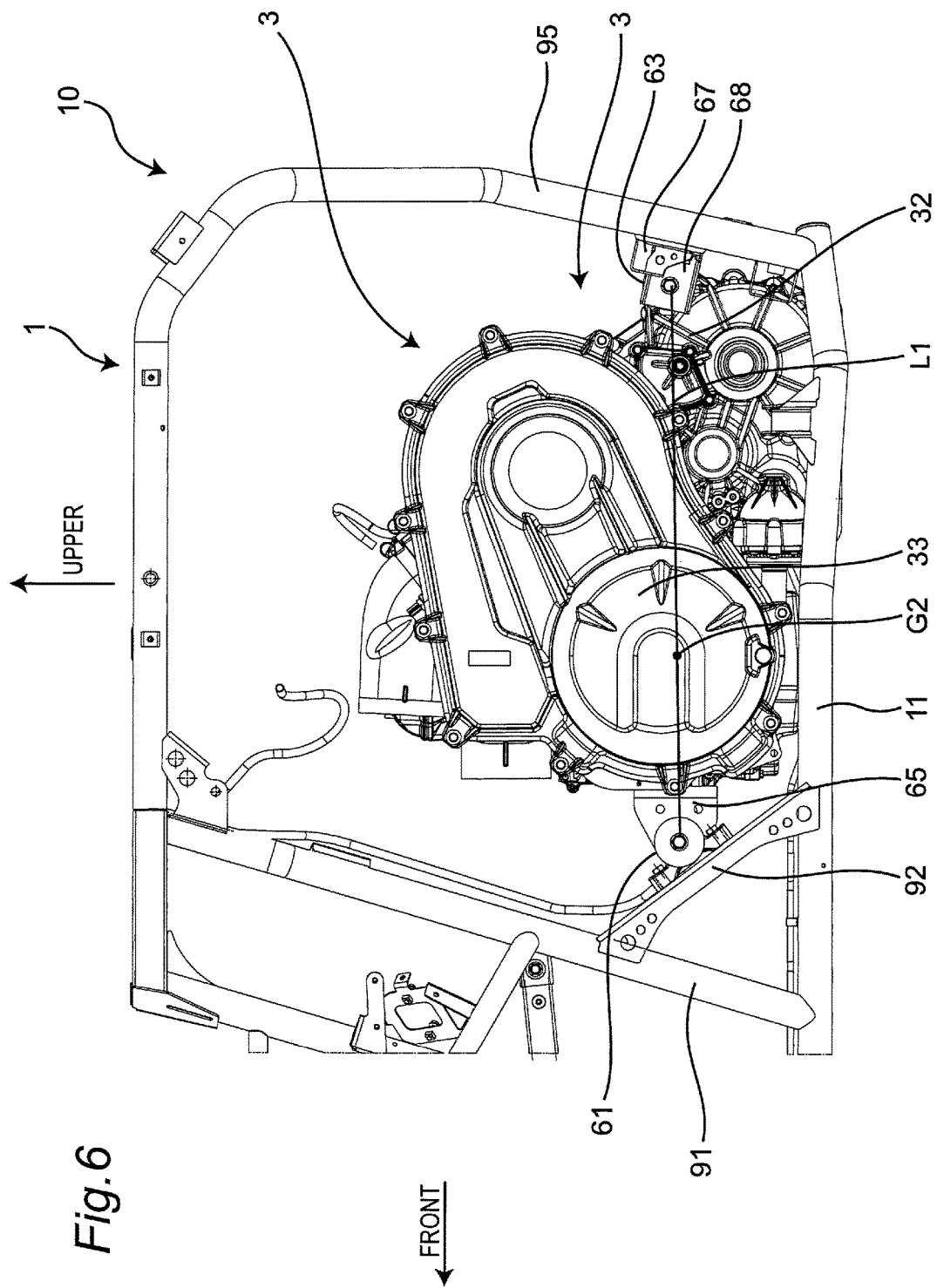
FIG. 6 is a side view of the power unit.

FIG. 6 is a side view of the power unit 3. Herein, planarly viewing the power unit 3 corresponds to viewing the power unit 3 from above or below the utility vehicle 10. FIG. 4 is a plan view of the power unit 3. Laterally viewing the power unit 3 corresponds to viewing the power unit 3 in the vehicle width direction of the utility vehicle 10. FIG. 6 is a side view of the power unit 3.

Figure 7:
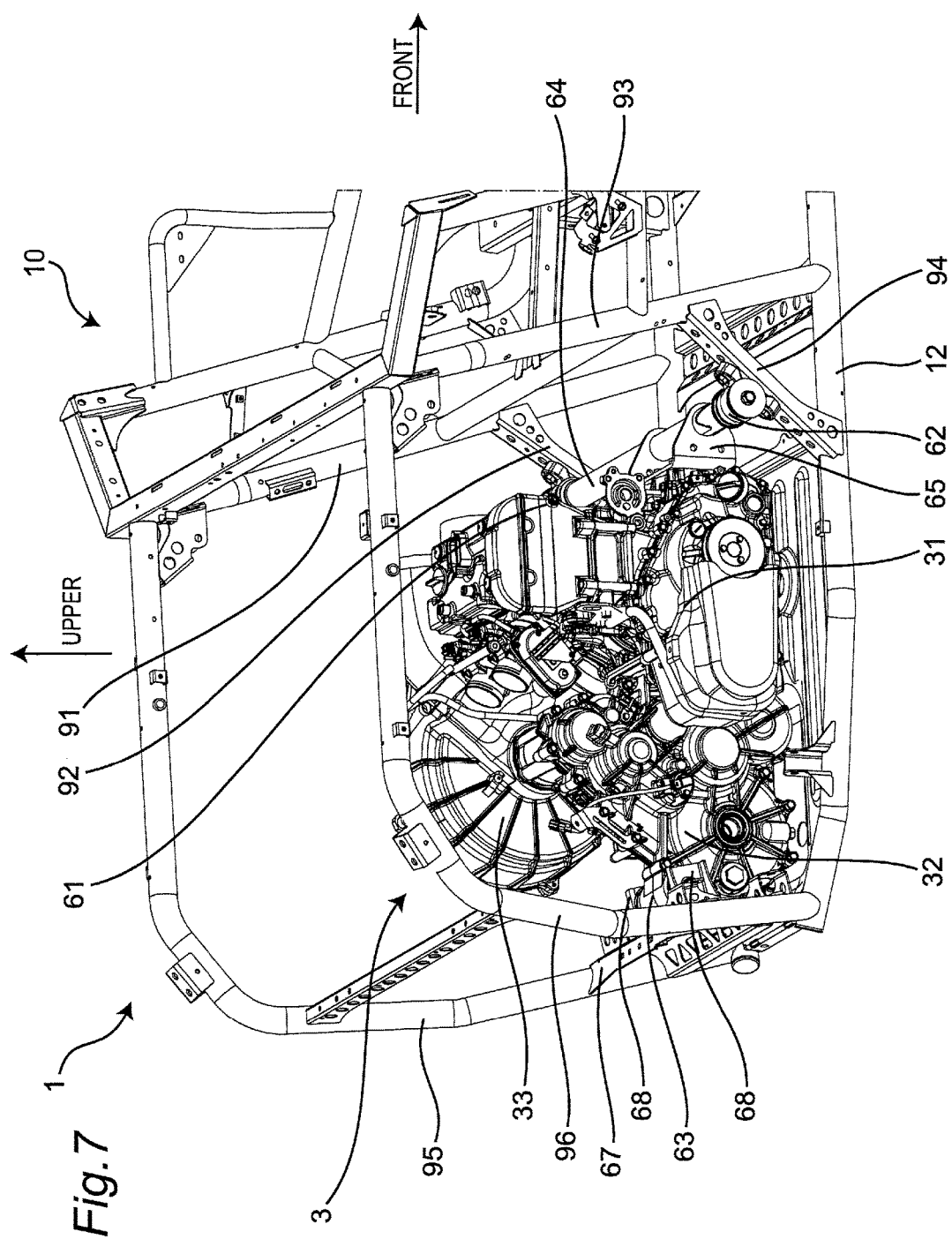
FIG. 7 is a rear perspective view of the power unit.

FIG. 7 is a rear perspective view of the power unit 3. As depicted in FIGS. 3 to 7, the power unit 3 is supported to the vehicle body frame 1 at a pair of left and right front support portions 61 and 62 supporting the front end of the power unit 3, and a single rear support portion 63 supporting the rear end of the power unit 3. Specifically, the front support portion 61 is attached to a gusset 92. The gusset 92 couples the bottom first frame 11 and an intermediate vertical frame 91 extending slantedly backward from an intermediate portion toward an upper portion of the bottom first frame 11, to reinforce the bottom first frame 11 and the intermediate vertical frame 91. The front support portion 62 is attached to a gusset 94. The gusset 94 couples the bottom second frame 12 and an intermediate vertical frame 93 extending slantedly backward from an intermediate portion toward an upper portion of the bottom second frame 12, to reinforce the bottom second frame 12 and the intermediate vertical frame 93.

The front support portion 61 and the front support portion 62 are coupled to each other by a tubular cross member 64 extending in the vehicle width direction, and bolts 66 fix a case of the power unit 3 and a bracket 65 attached to an intermediate portion in the vehicle width direction of the cross member 64. The front support portions 61 and 62 are each attached to the cross member 64 via a damper member 641 that relieves transmission of vibration of the power unit 3 to corresponding one of the front support portions 61 and 62 and corresponding one of the gussets 92 and 94.

FIG. 8 is a rear perspective view from a direction different from FIG. 7, of the power unit 3. As depicted in FIGS. 3 to 8, the rear support portion 63 is supported by a rear end member 67 rising from the rear ends of the bottom first frame 11 and the bottom second frame 12 via brackets 68. The brackets 68 are paired and provided on the left and the right of the rear support portion 63. The rear support portion 63 is attached to the brackets 68 via damper members 681 that relieve transmission of vibration of the power unit 3 to the brackets 68 and the rear end member 67. The rear end member 67 has a plate-like shape, and couples a rear vertical frame 95 extending upward from the rear end of the bottom first frame 11 and a rear vertical frame 96 extending upward from the rear end of the bottom second frame 12.

The rear end member 67 supports the plurality of control rods 42 extending in the vehicle width direction and coupling the rear end member 67 and the rear end of the trailing arm 41 extending in the anteroposterior direction. The control rods 42 supported by the rear end member 67 are specifically attached to the brackets 68 attaching the rear support portion 63.

The front support portions 61 and 62 and the rear support portion 63 are disposed such that a centroid G1 of a triangle T connecting the front support portions 61 and 62 and the rear support portion 63 agrees with a centroid G2 of the power unit 3 in a planar view of the power unit 3. The centroid G1 and the centroid G2 have only to agree with each other in a planar view of the power unit 3 and can be displaced vertically.

In a side view of the power unit 3, the front support portion 61 and the front support portion 62 are disposed to agree with each other, and the centroid G2 of the power unit 3 is positioned on a straight line L1 connecting each of the front support portions 61 and 62 and the rear support portion 63. The straight line L1 is parallel to the bottom first frame 11 and the bottom second frame 12 and is substantially parallel to the horizontal plane. The centroid G2 has only to be positioned on the straight line L1 in a side view of the power unit 3, and can be displaced in the vehicle width direction.

The mounting structure for the power unit thus configured achieves the following effects.

(1) The power unit 3, which is supported at the front support portions 61 and 62 and the rear support portion 63, can have a simplified mounting structure therefor.

(2) The centroid G1 of the triangle connecting the front support portions 61 and 62 and the rear support portion 63 agrees with the centroid G2 of the power unit 3, for reduction in horizontal vibration of the power unit 3. Specifically, the power unit 3 can be reduced in amount of horizontal displacement, in speed of displacement, in attenuation (convergence), and the like.

(3) The centroid G2 of the power unit 3 is positioned on the straight line L1 connecting each of the front support portions 61 and 62 and the rear support portion 63, for reduction in vertical vibration of the power unit 3. Specifically, the power unit 3 can be reduced in amount of vertical displacement, in speed of displacement, in attenuation (convergence), and the like.

(4) The front support portions 61 and 62 are supported by the gussets 92 and 94 attached to the bottom first frame 11 and the bottom second frame 12 configuring the main frame, without need for any dedicated bracket attached directly to the main frame, to simplify the mounting structure for the power unit. The rear support portion 63 is supported by the rear end member 67 rising from the rear ends of the bottom first frame 11 and the bottom second frame 12 configuring the main frame, and thus stably supports the power unit 3.

(5) There is provided the single rear support portion 63 for higher design flexibility in disposition of the control rods 42 of the suspension devices 4 and the like at the rear end of the main frame, which improves stability and performance of the suspension devices 4.

(6) The front support portions 61 and 62 are each attached to the cross member 64 via the damper member 641 that relieves transmission of vibration of the power unit 3 to corresponding one of the front support portions 61 and 62 and corresponding one of the gussets 92 and 94.

(7) The rear support portion 63 is attached to the brackets 68 via the damper members 681 that relieve transmission of vibration of the power unit 3 to the brackets 68 and the rear end member 67.

(8) The power unit 3 includes the engine 31, the transmission 32, and the V-belt continuously variable transmission 33, and the engine 31 generates driving power transmitted to the transmission 32 via the continuously variable transmission 33. This configuration achieves easy transmission of driving power of the engine 31.

The power unit 3 according to the embodiment described above includes the engine 31 and the transmission 32 provided separately from each other, and driving power of the engine 31 is transmitted to the transmission 32 via the continuously variable transmission 33. The engine and the transmission can alternatively be provided integrally with each other without provision of any continuously variable transmission. This configuration achieves rationalization of spaces for the engine and the transmission. The engine and the transmission provided integrally with each other also achieve homogenization in vibration property of the power unit.

The present invention can be modified or changed in various manners without departing from the spirit and the scope of the present invention recited in the following patent claims.

What is claimed is:

1. A mounting structure for a power unit of a utility vehicle, the mounting structure comprising:
    a left front support portion supporting a left front end of the power unit;
    a right front support portion supporting a right front end of the power unit; and
    a rear support portion supporting a rear end of the power unit,
    wherein the left front support portion, the right front support portion, and the rear support portion are disposed such that a centroid of a triangle connecting the left front support portion, the right front support portion, and the rear support portion coincides with a centroid of the power unit in a plan view of the power unit.

2. The mounting structure for the power unit of the utility vehicle according to claim 1, wherein
    the left front support portion, the right front support portion, and the rear support portion are situated in a planar configuration and disposed so that the centroid of the power unit is positioned on a straight line connecting each of the left front support portion and the right front support portion to the rear support portion in a side view of the power unit.

3. The mounting structure for the power unit of the utility vehicle according to claim 1, wherein:
    the left front support portion and the right front support portion are supported by a pair of left and right gussets reinforcing a main frame and are coupled by a cross member extending in a vehicle width direction; and
    the rear support portion is supported by a rear end member rising from a rear end of the main frame.

4. The mounting structure for the power unit of the utility vehicle according to claim 3, wherein
    the rear end member supports a plurality of control rods extending in the vehicle width direction and coupling the rear end member and a rear end of a trailing arm extending in an anteroposterior direction.

5. The mounting structure for the power unit of the utility vehicle according to claim 1, wherein:
    the power unit includes an engine, a transmission, and a V-belt continuously variable transmission; and
    the engine generates driving power transmitted to the transmission via the continuously variable transmission.

* * * * *